(12) United States Patent
Lennard

(10) Patent No.: US 9,607,529 B2
(45) Date of Patent: Mar. 28, 2017

(54) TAXIDERMY MANNEQUIN AND METHOD OF MAKING THE SAME

(71) Applicant: McKenzie Sports Products LLC, Salisbury, NC (US)

(72) Inventor: Scott Lennard, Libby, MT (US)

(73) Assignee: MCKENZIE SPORTS PRODUCTS LLC, Salisbury, NC (US)

( * ) Notice: Subject to any disclaimer, the term of this patent is extended or adjusted under 35 U.S.C. 154(b) by 177 days.

(21) Appl. No.: 14/246,617

(22) Filed: Apr. 7, 2014

(65) Prior Publication Data

US 2015/0056593 A1  Feb. 26, 2015

Related U.S. Application Data

(60) Provisional application No. 61/867,702, filed on Aug. 20, 2013.

(51) Int. Cl.

| G09B 23/00 | (2006.01) |
|---|---|
| G09B 23/36 | (2006.01) |
| B29C 44/12 | (2006.01) |
| B29K 75/00 | (2006.01) |
| B29L 31/00 | (2006.01) |

(52) U.S. Cl.
CPC ............ G09B 23/36 (2013.01); B29C 44/12 (2013.01); *B29K 2075/00* (2013.01); *B29L 2031/7028* (2013.01)

(58) Field of Classification Search
USPC ....................................... 434/296
See application file for complete search history.

(56) References Cited

U.S. PATENT DOCUMENTS

| 3,200,515 A | * | 8/1965 | Daigre ............... B44C 5/06 434/296 |
| 4,432,919 A | * | 2/1984 | Rinehart ............ A63H 9/00 264/271.1 |
| 4,596,683 A | * | 6/1986 | Powell ............. A63H 33/001 249/96 |
| 4,629,650 A | * | 12/1986 | Kataoka ............ B29C 47/261 156/247 |
| 4,735,752 A | * | 4/1988 | Negethon, Jr. ..... B29C 33/3878 264/19 |

(Continued)

*Primary Examiner* — Aarti B Berdichevsky
*Assistant Examiner* — Dolores Collins
(74) *Attorney, Agent, or Firm* — Panitch Schwarze Belisario & Nadel LLP

(57) ABSTRACT

A method of manufacturing a taxidermy mannequin includes providing a mold having an open end, a wall having an internal surface and an opposing external surface, and an internal cavity surrounded by the internal surface of the wall. The method further includes applying a layer of a mold release material to a portion of the internal surface, applying a powder material on an exposed surface of the mold release material, applying a layer of a glue mixture on an exposed surface of the powder material and the mold release material layer, applying a granular or fibrous material on an exposed surface of the glue mixture layer, allowing the glue mixture to at least partially dry, filling at least a portion of the internal cavity of the mold with a liquid expandable urethane foam, allowing the expandable urethane foam to expand and harden, and removing the taxidermy mannequin from the mold.

14 Claims, 4 Drawing Sheets

(56) References Cited

U.S. PATENT DOCUMENTS

| | | | | |
|---|---|---|---|---|
| 4,753,412 A * | 6/1988 | Johnson | A63H 9/00 | |
| | | | 249/55 | |
| 4,775,323 A * | 10/1988 | Johnson | G09B 23/30 | |
| | | | 428/16 | |
| 6,458,434 B1 * | 10/2002 | Coombs, Jr. | B29C 33/304 | |
| | | | 425/524 | |
| 6,629,872 B2 * | 10/2003 | Cheung | A63H 3/44 | |
| | | | 434/295 | |
| 6,799,974 B2 * | 10/2004 | Martin | G09B 23/30 | |
| | | | 428/16 | |
| 8,162,670 B2 * | 4/2012 | Hacke | G09B 23/36 | |
| | | | 428/16 | |
| 8,512,045 B2 * | 8/2013 | Bittner | B32B 27/302 | |
| | | | 428/34.1 | |
| 8,608,483 B2 * | 12/2013 | Trotta | B29C 39/006 | |
| | | | 434/267 | |
| 8,678,831 B2 * | 3/2014 | Trotta | B29C 39/006 | |
| | | | 434/273 | |
| 8,753,126 B2 * | 6/2014 | Eppley | G09B 23/36 | |
| | | | 434/295 | |
| 9,064,429 B2 * | 6/2015 | Martin | G09B 23/36 | |
| 9,123,261 B2 * | 9/2015 | Lowe | G09B 23/30 | |
| 9,275,557 B2 * | 3/2016 | Trotta | B29C 39/006 | |
| 2006/0154214 A1 * | 7/2006 | Miller | B28B 11/0809 | |
| | | | 434/82 | |

* cited by examiner

TAXIDERMY MANNEQUIN AND METHOD OF MAKING THE SAME

CROSS-REFERENCE TO RELATED APPLICATIONS

This application claims priority to U.S. Provisional Patent Application No. 61/867,702, filed on Aug. 20, 2013, entitled "Taxidermy Form and Method of Making the Same," the entire contents of which are incorporated by reference herein.

BACKGROUND OF THE INVENTION

An embodiment of the present invention relates generally to the art of taxidermy, and more particularly, to a taxidermy mannequin and a method for manufacturing a taxidermy mannequin.

In the field of taxidermy, most animal skins are mounted over a rigid foam animal form (sometimes referred to as a "mannequin," "mannequin form," "taxidermy mannequin" or "taxidermy form"). The animal skins may be from the head of the animal or other parts of an animal carcass. Thus, the taxidermy mannequin may approximate the shape or form of an animal head or any other body part of an animal. More particularly, the taxidermy mannequin takes the place of an animal's skull, bones, tissue, muscles and the like, and generally replicates the shape and form of a particular body part of the animal for supporting the animal's skin or hide thereon. Different taxidermy mannequins are required for different types of animals and animals of different sizes.

Typically, the taxidermy mannequin is in the shape or form of the head of an animal, such as a deer or elk. Accordingly, hereinafter, a description of the taxidermy mannequin according to the present invention is generally set forth with reference to the form for an animal head. However, it will be understood by one skilled in the art that the taxidermy mannequin may have various shapes and forms of different body parts (other than a head) for various types of animals.

Conventionally, to mount an animal skin or hide (not shown) on a taxidermy mannequin to make an animal mount, a taxidermist first removes the animal hide from an animal carcass, tans the animal hide, soaks the animal hide in water to make it pliable, and finally attaches the animal hide to the taxidermy mannequin. More particularly, in the case of the taxidermy mannequin in the shape of an animal head, the animal hide is first removed from the skull of the animal, the removed animal hide is then tanned and soaked in water, the treated animal hide is then stretched around the taxidermy mannequin, and finally the positioned animal hide is glued to the taxidermy mannequin to replicate an animal head. The glue or hide paste used to secure the treated animal hide to the taxidermy mannequin is typically a water-based dextrin or latex glue, as such glues allow the animal hide to be moved to its proper position on the taxidermy mannequin and also secured to the various contours of the taxidermy mannequin. Finally, additional features, such as glass eyeballs, may be added to make the animal mount more lifelike.

Taxidermists may purchase taxidermy mannequins from outside suppliers or they may manufacture their own forms using production molds. To make conventional taxidermy mannequins, such as the taxidermy mannequin 100 shown in FIGS. 1-1A, the taxidermist or the outside supplier typically uses a hollow mold (not shown) in the form of an animal body part (or a portion thereof) and pours or injects a lightweight material 120 into the cavity of the hollow mold. The lightweight material 120 is generally a liquid slurry material that hardens, cures or otherwise sets up in the mold. For example, the lightweight material 120 may be a two-part liquid, expanding rigid polyurethane foam. Such foams include a blowing agent blended into the liquid resins. The blowing agent promotes the foaming or expansion of the liquid resins when they are mixed and also causes the resulting taxidermy mannequin 100 to have a hard external surface, as described below. When the lightweight material 120 cures or hardens, the generally rigid taxidermy mannequin 100 is removed from the mold. The finished taxidermy mannequin 100 takes the shape of an animal body part (particularly an animal head) and is strong, but lightweight. The taxidermy mannequin 100 can then be cut, rasped, filed or otherwise easily reshaped to approximate the different shapes and sizes of individual animals.

The resulting taxidermy mannequin 100 has an interior made of the lightweight material 120 (i.e., expanded polyurethane foam) and an external surface 110. The external surface 110, which was in contact with the inner surface of the mold, is generally slick or waxy and is in the form of a hardened skin. Such characteristics of the external surface 110 are a result of separate conditions in the conventional manufacturing process. Specifically, due to the properties of conventional urethane foam, when the form 100 is removed from the mold, its external surface 110 is a shiny, hardened, and water-resistant surface or skin. The external surface 110 is harder and smoother than the interior 120 of the taxidermy mannequin 100.

The hard external surface 110 of the taxidermy mannequin 100 is a desirable characteristic. However, the slick or waxy nature of the external surface 110 is problematic for taxidermists, because the glue or hide paste typically used to secure an animal hide to the taxidermy mannequin 100 does not sufficiently adhere to the external surface 110 of the form 100, and thus the animal hide cannot be sufficiently adhered to the taxidermy mannequin 100. Accordingly, taxidermists must further alter the external surface 110 of the taxidermy mannequin 100 by a roughening process, such as sanding, filing, scratching, chemically etching, or otherwise using sandpaper, files, rasps, wire brushes, or other similar tools. The roughened external surface 110 then generally allows the animal hide to adhere more easily to the taxidermy mannequin 100. However, this is a time-consuming and messy process. Further, an improperly prepared taxidermy mannequin 100 can result in improper adhesion between the animal hide and the form 100, which results in a poor quality taxidermy mount.

Thus, it would be desirable to provide a taxidermy mannequin which has a hard external surface that does not need to be subsequently treated by a roughening process after being removed from the taxidermy mold. It would also be desirable to provide a method for making such a taxidermy mannequin.

It would also be desirable to provide an improved blowing agent for the liquid urethane foam typically used to make taxidermy mannequins. Freon was used as a blowing agent in the past, but was phased out once it became known that Freon depleted the ozone layer. Less ozone-depleting chemicals were then substituted as blowing agents, but were also mandated to be slowly phased out over time due to health and environmental concerns. Today, the only approved blowing agents are quite expensive and some of the approved blowing agents are flammable. It would therefore be desirable to provide a less expensive and environmentally-friendly blowing agent that would still produce a hard external surface of the taxidermy mannequin.

BRIEF SUMMARY OF THE INVENTION

Briefly stated, an embodiment of the present invention is directed to a method of manufacturing a taxidermy mannequin. The method comprises providing a mold including an open end, a wall having an internal surface and an opposing external surface, and an internal cavity surrounded by the internal surface of the wall of the mold. The method further comprises applying a layer of a mold release material to at least a portion of the internal surface of the wall of the mold; applying a powder material on an exposed surface of the mold release material layer; applying a layer of a glue mixture including at least one water-soluble glue on an exposed surface of the powder material and the mold release material layer; applying a granular or fibrous material on an exposed surface of the glue mixture layer; allowing the glue mixture to at least partially dry, such that the granular or fibrous material becomes adhered to the glue mixture and at least a portion of the granular or fibrous material becomes at least partially embedded within the glue mixture; filling at least a portion of the internal cavity of the mold with a liquid slurry containing an expanding urethane foam; allowing the expanding urethane foam to expand and harden within the internal cavity of the mold to form a taxidermy mannequin; and removing the taxidermy mannequin from the mold.

Another embodiment of the present invention is directed to a taxidermy mannequin comprising an interior body portion formed of a urethane foam and an external surface at least partially surrounding the interior body portion. The external surface comprises a glue mixture including at least one water-soluble glue and a granular or fibrous material adhered to the glue mixture. At least a portion of the granular or fibrous material is at least partially embedded within the glue mixture.

BRIEF DESCRIPTION OF THE SEVERAL VIEWS OF THE DRAWINGS

The following detailed description of a preferred embodiment of the present invention will be better understood when read in conjunction with the appended drawings. For the purposes of illustrating the invention, there is shown an embodiment that is presently preferred. It is understood, however, that the invention is not limited to the precise arrangements, materials and instrumentalities shown. In the drawings.

DETAILED DESCRIPTION OF THE INVENTION

Figure 1:
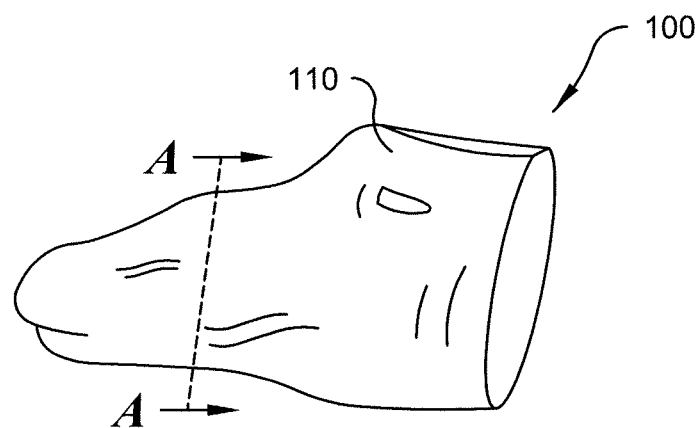
FIG. 1 is a right side elevational view of a conventional taxidermy mannequin.
Figure 1A:
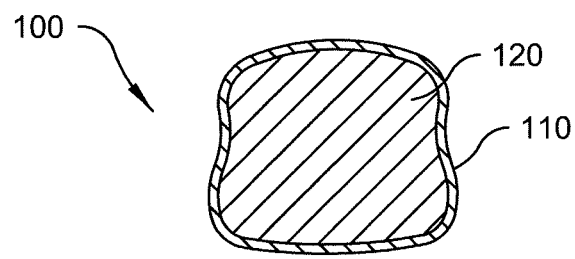
FIG. 1A is a cross-sectional view of the taxidermy mannequin shown in FIG. 1, taken along line A-A.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail, wherein the same reference numerals indicate like elements throughout, there is shown in FIGS. 2-8, a preferred embodiment of a taxidermy mannequin and a method for making the taxidermy mannequin. Referring specifically to FIGS. 2-4 and 6-6A, there is shown a production mold 40 for producing a taxidermy mannequin 10.

Figure 3:
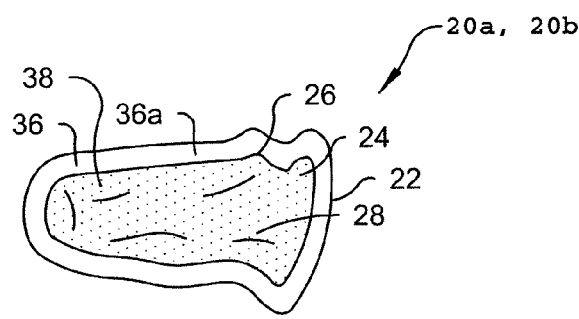
FIG. 3 is a top plan view of the mold half shown in FIG. 1 after the application of a granular or fibrous material.
Figure 4:
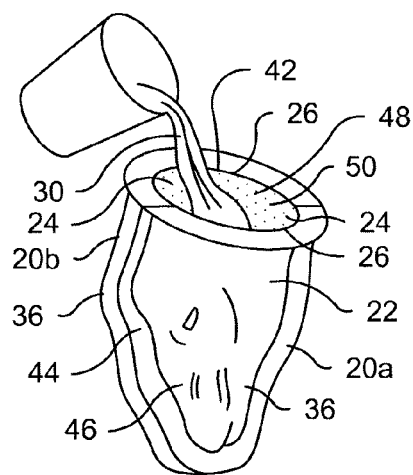
FIG. 4 is a perspective view of a production mold in accordance with a preferred embodiment of the present invention.
Figure 6:
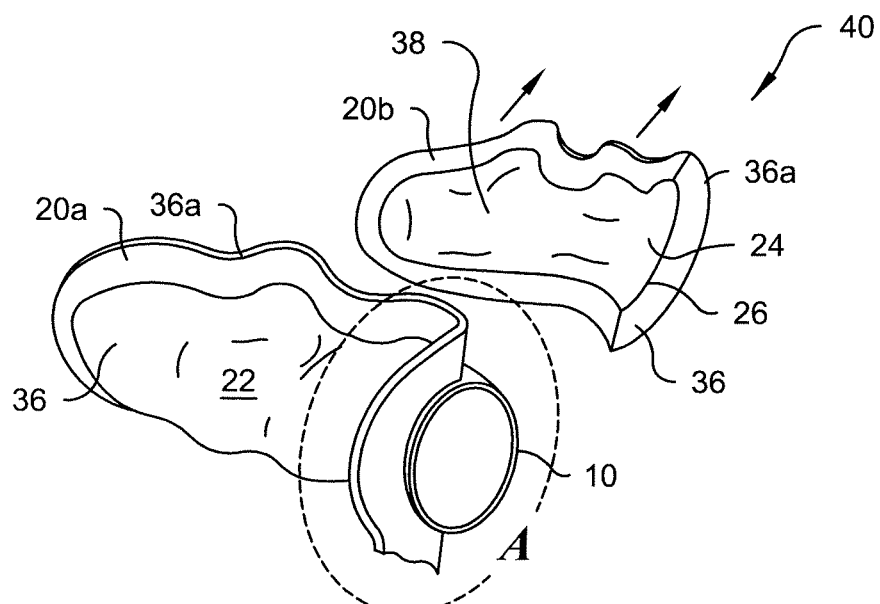
FIG. 6 is a partially exploded perspective view of the production mold shown in FIG. 4.

Referring to FIGS. 4 and 6, the production mold 40 is preferably comprised of two molds 20, and more particularly a first mold half 20a and a second mold half 20b. While only one mold half 20 is described herein in detail and depicted in FIGS. 2-3, it will be understood that the mold halve 20a, 20b are identical in form to each other and are subjected to the same treatment. More particularly, the first mold half 20a is a mirror image of the second mold half 20b.

Figure 2:
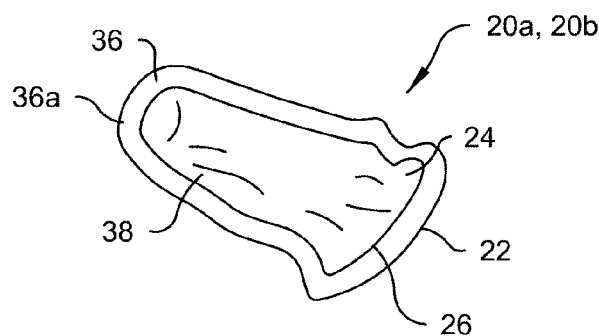
FIG. 2 is a top plan view of a mold half in accordance with a preferred embodiment of the present invention.

Referring to FIGS. 2-3, each mold half 20a, 20b is generally in the form of a half of the head of an animal. More particularly, the shape and contours of each mold half 20a, 20b generally approximate the shape and contours of a half of the head of an animal. However, it will be understood that each mold half 20a, 20b may approximate half of the shape and contours of any body part of an animal, such that the resulting production mold 40 and taxidermy mannequin 10 may approximate the whole shape and contours of any animal body part. It will also be understood that the production mold 40 and taxidermy mannequin 10 may approximate any body part of any animal, including, for example, a deer, an elk, a moose, an antelope, a bear, a mountain goat, a mountain lion, a bighorn, a caribou and the like.

It will also be understood that the production mold 40 need not be comprised of two separate mold halves and may instead be made of a single unitary or integral mold 20. Alternatively, the production mold 40 may be made from more than two mold halves 20a, 20b which may be joined together.

Referring to FIGS. 2-3, the first mold half 20a has an open end 26 and a wall 36 surrounding the open end 26. More particularly, a distal peripheral edge 36a of the wall 36 surrounds the open end 26. The wall 36 has an external surface 22 and an opposing internal surface 24. The wall 36 is generally concave so as to form an internal hollow cavity 38. More particularly, the internal surface 24 and the open end 26 generally define the internal hollow cavity 38 of the mold half 20. The wall 36 of the mold half 20a is preferably shaped and contoured to replicate or approximate the shape and contours of a half of the head of an animal. Each mold half 20a, 20b is preferably made of fiberglass, a polyester resin with fiberglass reinforcement, epoxy resin, urethane resin, or any rigid type plastic mold making material.

The production mold 40 is formed by joining or otherwise temporarily securing together the first mold half 20a and the second mold half 20a. More particularly, the first and second mold halves 20a, 20b are secured together by joining together the distal peripheral edges 36a of each wall 36, as shown in FIG. 4. The two mold halves 20a, 20b may be joined together by any known conventional technique, such as the use of an adhesive, mechanical fasteners, and a chemical process and the like. The resulting production mold 40 approximates the shape and contours of an animal body part, specifically a whole animal head. Referring to FIG. 4, the resulting production mold 40 has an open end 42 defined by the joined open ends 26 of the two mold halves 20, a wall 44 defined by the joined walls 36 of the two mold halves 20a, 20b, an external surface 46 defined by the external surfaces 22 of the two mold halves 20a, 20b, an internal surface 48 defined by the internal surfaces 24 of the two mold halves 20a, 20b, and an internal hollow cavity 50 defined by the cavities 38 of the two mold halves 20a, 20b. The internal cavity 50 of the production mold 40 is surrounded by the internal surface 48 of the wall 44.

In one embodiment, to produce a taxidermy mount, each mold half 20a, 20b of the production mold 40 undergoes a treatment process. As such, the completed production mold 40, formed by joining together the two mold halves 20a, 20b, may be considered as having been treated in the same manner as each individual mold half 20a, 20b. In one embodiment, the treatment process is preferably carried out substantially simultaneously for each mold half 20a, 20b, such that both treated mold halves 20a, 20b are prepared and ready for production of a taxidermy mount at the same time.

Figure 7:
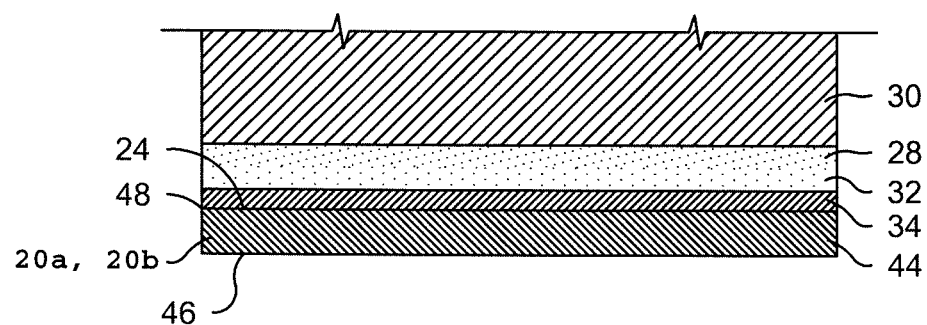
FIG. 7 is an enlarged cross-sectional elevational view of the composition of layers of the portion of the production mold shown in FIG. 6A.

First, a layer 34 of a mold release material is applied to at least a portion of the internal surface 24 of the wall 36 of each mold half 20a, 20b (see FIGS. 2 and 7). More preferably, the mold release layer 34 is applied to the entire internal surface 24 of each mold half 20a, 20b. The mold release material may be any compound or material that will prevent or reduce the likelihood of the material of the taxidermy mannequin 10, as described below, from sticking or otherwise adhering to the internal surface 24 of each mold half 20a, 20b to facilitate easy removal of the mannequin 10 from the mold half 20a, 20b.

Preferably, the mold release material is a semi-permanent mold release material that leaves little or no residue on the finished taxidermy mannequin 10. Some non-limiting examples of suitable mold release materials include wax-based substances (such as Johnson's Paste Wax® manufactured and sold by SC Johnson and Sons, Inc. or Mann Ease Release® manufactured and sold by Mann Formulated Products) and silicone-based agents (such as Frekotte Lifft® manufactured and sold by Loctite Corporation). However, it will be understood by one of ordinary skill in the art that any semi-permanent mold release material which is known or which may be developed may be used to coat the internal surface 24 of each mold half 20a, 20b, as long as the material is one which will prevent the material of the taxidermy mannequin 10 from sticking to the internal surface 24 and which leaves little or no residue on the finished taxidermy mannequin 10. Preferably, the internal surface 24 is allowed to dry for a predetermined period of time, such as one to two minutes, in order to allow the solvent to evaporate from the mold release material.

In one embodiment, fine particles, generally in the form of a powder material, are preferably applied to at least a portion of the internal surface 24, and more preferably to the entire internal surface 24, of the wall 36 of each mold half 20a, 20b. More particularly, the powder material is applied on the exposed, innermost surface of the mold release layer 34 coating the internal surface 24. The powder material serves to prevent clumping or beading of the glue mixture that is subsequently applied to the internal surface 24, as described hereinafter. The powder material may be applied to the internal surface 24 by any conventional technique, such as, for example, spraying, brushing, sprinkling, coating, painting and the like. Some examples of the type of powder material that may be used include conventional talcum powder, baking flour, or any similar powder material. Preferably, any inert powder, and more particularly inert talcum powder, may be used. However, it will be understood by those skilled in the art that any particulate or powder material may be used, as long as it sufficiently prevents beading of the subsequently applied glue mixture.

Figure 8:
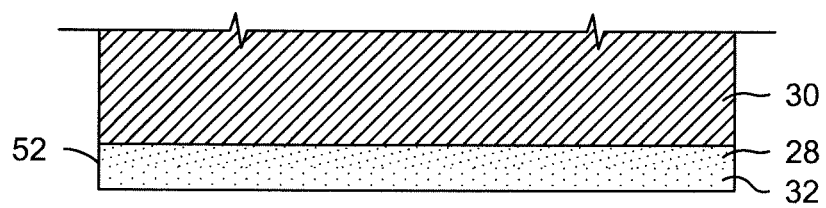
FIG. 8 is an enlarged cross-sectional elevational view of the composition of layers of the taxidermy mannequin shown in FIG. 5.

Next, a layer 32 of a glue mixture is applied to at least a portion of the internal surface 24, and more preferably to the entire internal surface 24, of the wall 36 of each mold half 20a, 20b (see FIGS. 2 and 7-8). More particularly, the glue mixture layer 32 is applied on the exposed, innermost surface of the powder material and the mold release layer 34 coating the internal surface 24. The glue mixture may be applied to the internal surface 24 by any conventional technique, such as, for example, spraying, brushing, coating, painting and the like. As discussed above, the underlying powder material preferably prevents or at least reduces the cohesive effect of the glue mixture, such that the glue mixture does not clump or bead up. Accordingly, the glue mixture is evenly and uniformly distributed along the internal surface 24 of each mold half 20a, 20b. The glue mixture preferably comprises at least one water-soluble glue and at least one alcohol. Preferably, the glue mixture is a pre-mixed solution. The alcohol is preferably isopropyl or grain alcohol. The water-soluble glue may be any conventional glue, such as Elmer's® glue.

Next, as shown in FIG. 3, a granular or fibrous material 28 is applied to at least a portion of the internal surface 24, and more preferably to the entire internal surface 24, of the wall 36 of each mold half 20a, 20b. More particularly, the granular or fibrous material 28 is applied on the exposed, innermost surface of the glue mixture layer 32, the powder material and the mold release layer 34 coating the internal surface 24. Preferably, at least a portion of the granular or fibrous material 28 becomes at least partially embedded in the glue mixture layer 32, and more preferably a first portion of the granular or fibrous material 28 becomes partially embedded in the glue mixture layer 32 and a second portion of the granular or fibrous material 28 becomes fully embedded in the glue mixture layer 32. In one embodiment, the granular or fibrous material 28 is preferably comprised of inert particles having a medium to coarse particle size Examples of suitable inert granular or fibrous materials include sand, sawdust, paper pulp, and the like. However, it will be understood by those skilled in the art that any similarly sized particles may be used for the granular or fibrous material 28. Preferably, the granular or fibrous material 28 is medium to coarse sawdust.

The granular or fibrous material 28 may be applied to the internal surface 24 by any conventional technique, such as, for example, spraying, brushing, sprinkling, coating, painting and the like. In one embodiment, the granular or fibrous material 28 is applied to the internal surface 24 substantially immediately after the glue mixture layer 32 is applied thereto. More particularly, the granular or fibrous material 28 is applied to the internal surface 24 before the underlying applied layer 32 of glue has completely dried and is thus still at least partially wet to ensure that some of the granular or fibrous material 28 becomes at least partially embedded in the glue mixture layer 32.

Next, the production mold 40 is formed, preferably substantially immediately after application of the granular material 28. More particularly, while the glue mixture 32 is still wet and after the granular or fibrous material 28 has been applied onto the glue mixture 32, the two mold halves 20a, 20b are connected together, preferably by joining together the distal peripheral edges 36a of each mold half 20a, 20b. The resulting production mold 40 is thus a two-part fiberglass mold.

The production mold 40 is then allowed to rest, preferably undisturbed, for a predetermined period of time. More particularly, the production mold 40 is allowed to remain undisturbed for a predetermined period of time, until substantially all, and more preferably all, of the granular or fibrous material 28 has adhered to the underlying glue mixture 32 in both mold halves 20a, 20b and the glue mixture 32 in both mold halves 20a, 20b is at least partially, and more preferably completely, dried. In one embodiment, the glue mixture 32 is allowed to dry naturally by exposure to the surrounding air. Typically, complete drying of the glue mixture 32 takes approximately ten to twenty minutes if simply exposed to the surrounding air. However, it will be understood that the drying time may vary depending on the particular composition of the glue mixture 32. In another embodiment, the drying process is accelerated by passing or forcing heated air across the surface of the glue mixture 32 and granular or fibrous material 28. The application of the heated air also accelerates the process of the granular or fibrous material 28 adhering to the glue mixture 32.

Once the glue mixture 32 is dried and the granular or fibrous material 28 has been adhered thereto and therein, at least a portion of the granular or fibrous material 28 is preferably disposed on the exposed, innermost surface of the glue mixture layer 32, at least another portion of the granular or fibrous material 28 is preferably at least partially embedded within the glue mixture layer 32, and at least another portion of the granular or fibrous material 28 is preferably fully embedded within the glue mixture layer 32. More particularly, while a majority of the individual inert particles or fibers of the granular or fibrous material 28 are disposed on or only partially embedded within the surface of the glue mixture layer 32, some individual particles or fibers have also penetrated more deeply into the glue mixture layer 32 to become more deeply embedded therein. As such, the granular or fibrous material 28 is disposed in a graduated manner, with a large concentration of particles or fibers embedded along the exposed, innermost surface of the glue mixture layer 32 and the concentration of the particles or fibers decreasing in the direction of the depth of the glue mixture layer 32.

The completed production mold 40, comprised of the first and second treated mold halves 20a, 20b, is thus prepared for receiving the material 30 of the taxidermy mannequin. It will be understood by those skill in the art that any material conventionally known to be suitable for use in forming a taxidermy mount may be used. Preferably, the material 30 of the taxidermy mannequin is a lightweight material, and more preferably an expanding urethane foam, and most preferably an expanding polyurethane foam.

Referring to FIG. 4, the material 30 of the taxidermy mannequin is preferably received within the internal cavity 50 of the production mold 40 in the form of a liquid slurry. More particularly, the liquid slurry is a mixture of liquid urethane resin (and more preferably a liquid polyurethane resin) and a blowing agent. The blowing agent may be any material conventionally known to be a suitable agent for promoting foaming of the urethane resin. In one embodiment, the blowing agent is preferably water. The use of water as a blowing agent has obvious significant environmental benefits over various chemical-based blowing agents which are often subject to strict domestic and international regulations.

As shown in FIG. 4, the slurry of the liquid urethane resin and water is poured, injected, or otherwise provided into the internal cavity 50 of the production mold 40. The internal cavity 50 may be only partially filled with the liquid slurry, but is preferably substantially filled with the liquid slurry. It will be understood that the internal cavity 50 should not be completely filled with the slurry so that there is sufficient room for the slurry to foam up and expand. The filled mold 40 is then allowed to sit or rest for a predetermined period of time. During this predetermined period of time, the liquid expandable foam begins to foam up and expand within the internal cavity 50 of the production mold 40, and ultimately becomes hardened or cured to form a generally rigid and hardened taxidermy mannequin 10. The hardening or curing time may vary depending on the specific composition of the liquid expandable foam. In one embodiment, the hardening or curing time is approximately fifteen minutes. As the urethane foam expands, it begins to adhere to the glue mixture layer 32 and the inert particles or fibers 28 that are fully or partially embedded in the glue mixture layer 32. Preferably, however, the urethane foam does not penetrate through the glue mixture layer 32 and the mold release layer 34 to reach the internal surface 24 of each mold half 20a, 20b.

Figure 6A:
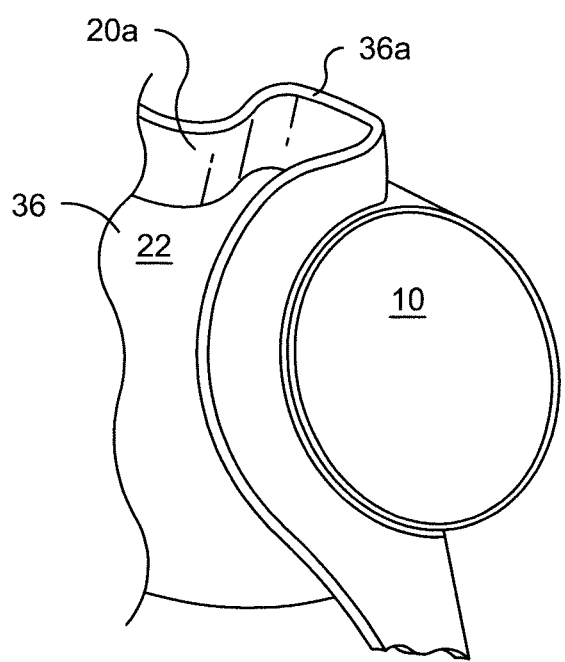
FIG. 6A is an enlarged and fragmentary view of a portion of the production mold shown in FIG. 6.

After the expanded foam material 30 has been at least partially hardened or cured, and more preferably completely hardened or cured, the resulting taxidermy mannequin 10 is removed from the production mold 40, as shown in FIGS. 6-6A. More particularly, to remove the finished taxidermy mannequin 10, the first and second mold halves 20a, 20b are separated from each other and the taxidermy mannequin 10 is then removed.

FIG. 7 is a cross-sectional view of one area of the production mold 40 after the foam material 30 has hardened and cured, but before the taxidermy mannequin 10 is removed from the production mold 40. As shown in FIG. 7, the filled production mold 40 is comprised of a plurality of layers arranged in succession as follows: the wall 44 of the production mold 40, a layer 34 of the mold release material disposed directly on the internal surface 50 of the wall 44, a layer 32 of the glue mixture disposed directly on the mold release layer 34, and the interior 30 of the finished taxidermy mannequin 10 comprised primarily of urethane foam. The glue mixture layer 32 also preferably includes the granular or fibrous material 28 disposed along the innermost surface of the layer 32 and/or embedded therein.

Figure 5:
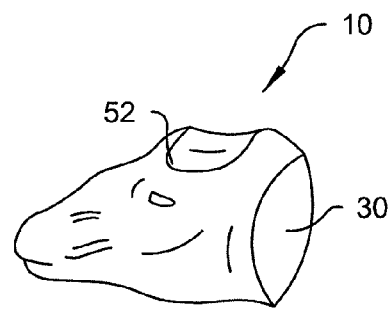
FIG. 5 is a right side elevational view of a taxidermy mannequin in accordance with a preferred embodiment of the present invention.

FIG. 8 is a cross-sectional view of one area of the taxidermy mannequin 10 after it has been removed from the production mold 40. As shown in FIG. 8, the mold release layer 34 is not removed with the taxidermy mannequin 10, and instead remains inside of the production mold 40. Referring to FIG. 5, the taxidermy mannequin 10 is preferably a generally solid and unitary piece. More preferably, the taxidermy mannequin 10 has an interior body portion 30 comprised primarily of urethane foam and an external surface or skin 52 at least partially surrounding the interior body portion 30. As shown in FIG. 8, as a result of the above-described treatment and curing process, the external surface 52 of the taxidermy mannequin 10 is preferably comprised of the glue mixture layer 32 including the granular or fibrous material 28 at least partially or fully embedded therein. The interior body portion 30 is preferably formed of a generally rigid polyurethane foam.

As discussed above, the liquid foam resin used to make the taxidermy mannequin 10 preferably comprises water as a blowing agent. While water causes the liquid resin to foam up and expand, it does not cause the external surface 52 of the taxidermy mount 10 to have a hardened surface finish as desired. Specifically, a hard external surface is beneficial because it provides structural stability to the taxidermy mannequin 10 and promotes securing of an animal hide (not shown) to the form 10. However, it was found that water could be used as a blowing agent and the external surface 52 of the taxidermy mannequin 10 would be a hardened foam surface, as desired, because of the addition of the glue mixture layer 32 and the granular or fibrous material 28. Specifically, because the glue mixture layer 32 and the granular or fibrous material 28 form the external surface 52 of the taxidermy mannequin 10, the taxidermy mannequin 10 has a hardened foam surface.

An animal or taxidermy mount (not shown) may then be produced by positioning a treated animal hide around the taxidermy mannequin 10 and securing the positioned animal hide to the taxidermy mannequin 10. In one embodiment, a glue or hide paste is used to secure the treated animal hide to the external surface 52 of the taxidermy mannequin 10. Preferably, a water-based dextrin or latex glue, is used. The application of the glue or hide paste causes the water-soluble glue of the glue mixture layer 32 of the external surface 52 to at least partially dissolve and/or become softened at least to a limited extent. In another embodiment, prior to securing the animal hide to the external surface 52 of the taxidermy mannequin 10, water or a solvent, such as alcohol, may be sprayed, misted, or otherwise applied onto the external surface 52, thereby causing the water-soluble glue of the glue mixture layer 32 to at least partially dissolve and/or become softened at least to a limited extent. A glue or hide paste, such as a water-based dextrin or latex glue, may also be used after the application of the water or solvent to further promote adherence of the animal hide to the taxidermy mannequin 10.

When the water soluble glue of the glue mixture layer 32 is partially dissolved and/or softened, the external surface 52 of the taxidermy mannequin 10 becomes sticky or tacky. More particularly, the external surface 52 of the taxidermy mannequin 10 is provided becomes adhesive. Thus, when the animal hide is positioned over the external surface 52 of the taxidermy mannequin 10, the softened/dissolved glue mixture layer 32 strongly bonds with the animal hide to form a complete taxidermy mount. More particularly, the granular or fibrous material 28 embedded within the glue mixture layer 32 simulates a roughened exposed outermost surface 52 and facilitates adherence of the animal hide to the exposed outermost surface 52 of the taxidermy mannequin 10. As such, no roughening treatment, such as sanding, etching and the like, is required for making an animal mount with the above-described taxidermy mannequin. Finally, additional features, such as glass eyeballs, may be added to make the taxidermy mount more life-like It will be appreciated by those skilled in the art that changes could be made to the preferred embodiments described above without departing from the broad inventive concept thereof. It is understood, therefore, that this invention is not limited to the particular embodiment disclosed, but is intended to cover modifications within the spirit and scope of the present application.

I claim:

1. A method of manufacturing a taxidermy mannequin, the method comprising:
   providing a mold, the mold including an open end, a wall having an internal surface and an opposing external surface, and an internal cavity surrounded by the internal surface of the wall of the mold;
   applying a layer of a mold release material to at least a portion of the internal surface of the wall of the mold;
   applying a powder material on an exposed surface of the mold release material layer;
   applying a layer of a glue mixture on an exposed surface of the powder material and the mold release material layer, the glue mixture including at least one water-soluble glue;
   applying a granular or fibrous material on an exposed surface of the glue mixture layer;
   allowing the glue mixture to at least partially dry, such that the granular or fibrous material becomes adhered to the glue mixture and at least a portion of the granular or fibrous material becomes at least partially embedded within the glue mixture;
   filling at least a portion of the internal cavity of the mold with a liquid slurry containing an expanding urethane foam;
   allowing the expanding urethane foam to expand and harden within the internal cavity of the mold to form a taxidermy mannequin; and
   removing the taxidermy mannequin from the mold.

2. The method of claim 1, wherein the mold comprises a first mold half and a second mold half.

3. The method of claim 2 further comprising joining together the first mold half and the second mold half.

4. The method of claim 1, wherein the mold release material is a semi-permanent mold release material.

5. The method of claim 1, wherein the powder material is talcum powder or backing flour.

6. The method of claim 1, wherein the glue mixture further includes an alcohol.

7. The method of claim 1, wherein the granular or fibrous material is a material selected from the group consisting of sand, sawdust, and paper pulp.

8. The method of claim 1, wherein the granular or fibrous material comprises inert particles or fibers.

9. The method of claim 1, wherein at least a portion of the granular or fibrous material is fully embedded within the glue mixture.

10. The method of claim 1, wherein the granular or fibrous material is applied on the exposed surface of the glue mixture while the glue mixture is still at least partially wet.

11. The method of claim 1, wherein the liquid slurry further contains water as a blowing agent.

12. A method for making a taxidermy mount, the method comprising:
   forming a taxidermy mannequin by the method of claim 1, the taxidermy mannequin having an interior body portion and an external surface at least partially surrounding the interior body portion, the external surface including a glue mixture having a water-soluble glue and a granular or fibrous material at least partially embedded within the glue mixture;
   at least partially softening at least a portion of the external surface of the taxidermy mannequin; and securing an animal hide to the at least partially softened portion of the external surface of the taxidermy mannequin.

13. The method of claim 12, wherein the at least partially softening at least a portion of the external surface includes application of a glue or hide paste to the external surface.

14. The method of claim 12, wherein the at least partially softening at least a portion of the external surface includes application of water or a solvent to the external surface.

* * * * *